H. LIEBMAN.
EDUCATIONAL DEVICE.
APPLICATION FILED AUG. 11, 1920.

1,400,887.

Patented Dec. 20, 1921.

INVENTOR:
*Harriet Liebman*
BY *F. DeWitt Goodwin*
ATTORNEY

UNITED STATES PATENT OFFICE.

HARRIET LIEBMAN, OF PHILADELPHIA, PENNSYLVANIA.

EDUCATIONAL DEVICE.

1,400,887. Specification of Letters Patent. Patented Dec. 20, 1921.

Application filed August 11, 1920. Serial No. 402,775.

*To all whom it may concern:*

Be it known that I, HARRIET LIEBMAN, a citizen of the United States, residing at Philadelphia, in the county of Philadelphia and State of Pennsylvania, have invented certain new and useful Improvements in an Educational Device, of which the following is a specification.

My invention relates to improvements in an educational device and the object of my invention is to provide a device for teaching number work in the home and in the classroom by the objective study of the numbers.

Figure 1:
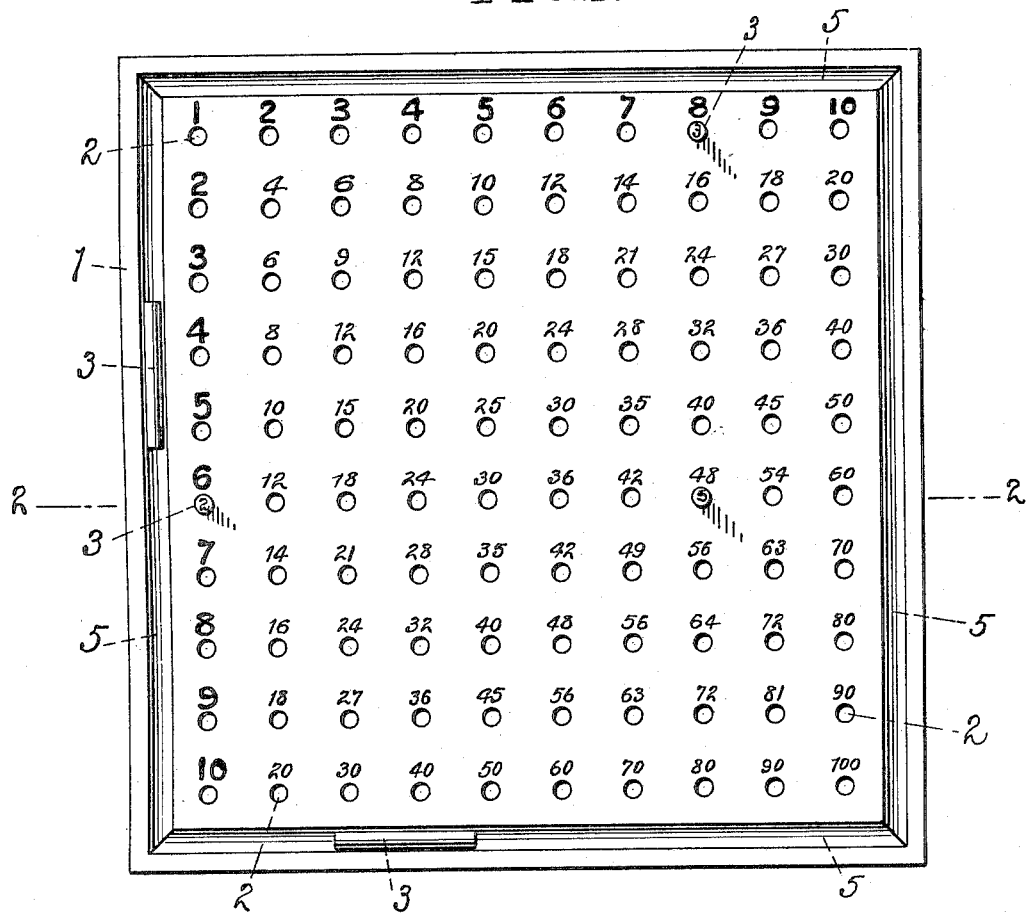
Figure 2:
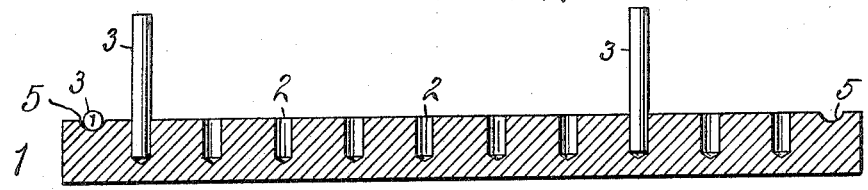

Referring to the accompanying drawing; Figure 1 is a plan view of my improved educational device, and Fig. 2 is a transverse section on line 2—2, Fig. 1.

In the drawing, in which like reference characters refer to like parts, 1 represents a base which is made of any suitable material, preferably of wood. The base 1 is rectangular in form and is provided with holes 2 to receive pins or markers 3. The said holes 2 are arranged in parallel rows formed in the top surface of the board and extend a sufficient distance into the board so that the pins 3 will be held in an erect position and may be easily inserted and removed.

Each hole 2, formed in the base, is numbered, as shown in Fig. 1. The left-hand vertical row and the top horizontal row are numbered one to ten, consecutively, and the remaining holes are numbered to correspond to multiples of the numbers shown on the top and left-hand rows. There are preferably ten numbers in each row, making a total of one hundred numbered holes upon the base.

The base is provided with a groove 5 formed in the top surface thereof and located adjacent to the outer edges thereof, in which the pins are retained when not in use.

The device is used by inserting the pins in the holes 2 of the board, and it may be used in numerous ways to instruct the pupil in number work. One illustration of the use of the device would be for the teacher to direct the pupil to place a pin in hole number six of the vertical left-hand row and a pin in hole number 8 of the top row and the pupil is then told to place a pin in the hole which is the product of the two numbers. The device may also be used in giving instructions in addition, subtraction and division, as well as in multiplication.

Two outside rows extending at right angles to each other, preferably the left-hand row and the top row of holes, which are used as the guide rows, have the numbers printed in a different type or color to differentiate them from the other numbers on the base.

The guide rows comprising the said left-hand row and the top row may consist of numbers only, dispensing with the holes in said rows, without departing from my invention. The device would then be used by the teacher directing the pupil to place a pin in the hole representing the product of, for example, six and eight. The pupil could readily answer the question by finding the numbers mentioned in the guide rows and following along said rows to the intersection thereof and placing the pin in the hole representing the answer.

Any number of pins may be used, but five pins have been found sufficient for general instruction in simple number work. Each pin may be numbered, so that it may be readily designated by placing a number upon the side or upon the end of the pin, as shown in the drawing.

The numbered pins are used when giving a series of questions which are to be answered by using pins having numbers thereon representing the order in which the questions are given. The teacher can then ask for the answers in any order best suited for drill work.

The advantages of this invention are that it assists in the intelligent repetition of number work necessary to fix the results in the oral and visual memory of the pupil, and it enables the pupil to obtain the results with accuracy and facility, thus attaining consequent skill in performing fundamental operations.

Heretofore kindergarten devices have been used comprising a board with holes therein and pins adapted to be inserted in the holes to form designs, but said devices were not provided with numbers and therefore were not suitable for the purpose for which this invention is intended.

Having thus described my invention, I claim and desire to secure by Letters Patent:

1. An educational device comprising, a base having holes formed therein, markers adapted to be retained in said holes, numbers placed upon the surface of the base adjacent to the said holes suitable for giving instructions in number work, said base having a sufficient surface area between the said holes to permit a number being associated closer to the hole it is intended to designate than to any other hole, and said numbers being positioned on the base so as to be visible when the markers are in the holes formed in said base.

2. An educational device comprising, a base having holes formed therein, pins adapted to be inserted in said holes and held in an erect position upon said base, numbers placed upon the surface of the base adjacent to the said holes suitable for giving instructions in number work, said base having a sufficient surface area between the said holes to permit a number being associated closer to the hole it is intended to designate than to any other hole, and said numbers being positioned on the base so as to be visible when the pins are in the holes formed in said base.

In testimony whereof I affix my signature.

HARRIET LIEBMAN.